April 22, 1958   M. SCHWARTZ   2,831,446
SOLDERING CAP FOR SPLICING WIRE
CONDUCTORS OF ELECTRICITY
Filed May 16, 1956

INVENTOR
MILTON SCHWARTZ.
BY
Samuel J Stoll
ATTORNEY

United States Patent Office 2,831,446
Patented Apr. 22, 1958

2,831,446

SOLDERING CAP FOR SPLICING WIRE CONDUCTORS OF ELECTRICITY

Milton Schwartz, Rego Park, N. Y.

Application May 16, 1956, Serial No. 585,137

5 Claims. (Cl. 113—110)

This invention relates to a soldering cap for splicing wire conductors of electricity.

It is recognized that a soldered splice of wire conductors provides a satisfactory mechanical and electrical connection. Purely mechanical splices are generally recognized as not being wholly satisfactory either as a mechanical connection or as an electrical connection. Nonetheless, it is not always possible or feasible to use solder for this purpose. For example, the splicing of signal wire in a combat area cannot ordinarily await the usual soldering preparations such as the heating of a soldering iron or the lighting of a soldering torch. Similarly, it is not always convenient or possible for unskilled persons to provide a conventional soldered splice. Consequently, although mechanical splices are known to be less satisfactory than soldered splices, they are very frequently employed in situations which would not permit of soldered applications.

A long-standing problem with wire splices, even soldered splices, is the provision of suitable insulation to cover the splice. The conventional practice is to wrap friction tape or the like around the splice and this is obviously an unsatisfactory method especially in connection with conductors which are used out-of-doors or in damp locations or in close proximity to metal parts or the like and there is also the danger of accidental contact between the spliced wires and those who may happen to be near them, such as small children.

The principal object of this invention is the provision of a soldering cap which may be used to solder spliced wires and to insulate the soldered splice automatically and immediately upon the conclusion of the soldering operation. More specifically, the soldering cap herein described and claimed contains within it the two essential elements of a soldering operation, namely, flux and a soldering material. In addition, it contains heat producing means which evenly distributes the flux throughout the spliced area and which melts the soldering material to apply it to the splice. Finally, there is a rubber insulating material which is in a normally compressed state and which expands following the soldering process to completely enclose that portion of the spliced wire which is disposed between the soldered end and the usual insulating covering and it also encloses a part of said covering.

Enclosing the foregoing materials is a dielectric cap and it will be seen that the rubber insulation presses inwardly against the spliced wire and outwardly against the inner wall of said cap to provide an insulating seal between the wire and the cap. The result is a composite structure consisting of spliced wires soldered together and adequately insulated throughout.

An important feature of this invention is the use of pre-stressed rubber insulation which is held in open tubular form by an inner sleeve of soldering material so that the wire which is to be spliced may readily be received both by said sleeve and said rubber insulation. When the soldering sleeve is melted, however, the rubber insulation expands and presses inwardly and against the soldered or spliced wire.

An important feature of this invention is the provision of igniting means which automatically ignites when the spliced wire is inserted into the device. In the preferred form of this invention, three materials are provided to create sufficient heat to melt the solder sleeve. The first is a strong oxidizing acid in concentrated form, such as sulfuric acid, 96%. This acid is contained within a rupturable capsule which is made, for example, of glass or acid resistant plastics. This capsule is situated at the base of the solder sleeve and in the path of a spliced wire which is inserted into said sleeve so that when contact is made between said wire and said capsule, the capsule will rupture and liberate the acid. The second material surrounds the capsule and it is adapted to react with the acid when the capsule ruptures in order to release oxygen. Preferably, this second material which surrounds the capsule is potassium chlorate which readily combines and reacts with a strong acid to liberate sufficient oxygen to provide combustion with the third material, namely, common sugar. This may be in the form of sucrose or other disaccharid or any of the monosaccharids or polysaccharids may be used. What is needed is a strong oxidizing agent, preferably potassium chlorate, which on reacting with a strong acid, such as sulfuric acid, will produce sufficient oxygen to oxidixe the sugar with sufficient energy or violence to produce combustion. The result is the generation of sufficient heat to melt the solder.

The invention is illustrated in the accompanying drawing in which.

Figure 1:
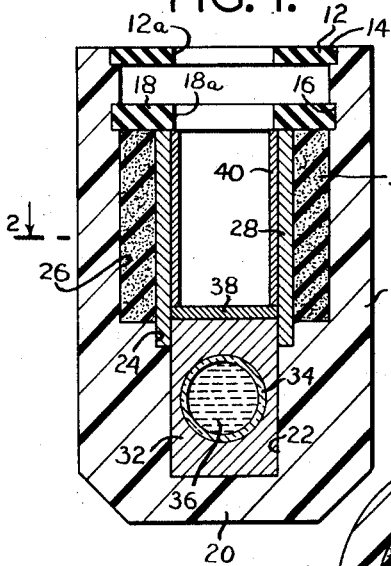
Fig. 1 is a longitudinal section through a soldering cap of the character herein claimed showing it prior to use.

The soldering device herein claimed includes an outer shell or casing 10 and a cover plate 12 of annular shape, the two together constituting a cap or closure. Casing 10 is made, preferably, of thermo-setting plastics and cover plate 12 may be made of the same material or hard rubber or the like. In the preferred form of this invention, the casing is generally cylindrical in shape, closed at the bottom and open at the top. An annular rabbet 14 is formed at the upper inner peripheral edge of casing 10 to receive the annular plate 12 and said annular plate may be cemented thereto. An annular groove 16 is formed on the inner wall of said casing a spaced distance below the rabbet 14 and mounted therein is a retaining washer 18 which may be made of thermo-setting plastics. In the preferred form of this invention, the casing and said retaining washer 18 are made of molded phenolic resin and asbestos. This composition is not only electrically insulating but it is also heat resistant.

Immediately above the bottom wall 20 is a well 22 situated centrally of the casing 10. This well enlarges at its upper end to form an annular rabbet 24 and said rabbet then enlarges further to form a cylindrical chamber 26. A cylindrical sleeve 28 of solder, preferably a lead—tin alloy with two parts of lead to one of tin, is disposed within the casing, its lower end supported in rabbet 24 and its upper end abutting the retaining washer 18 which holds it in place. An annular space is now formed between the inner wall of casing 10 and said cylindrical solder sleeve 28 and occupying said annular space is a rubber sleeve 30. This rubber sleeve is made of foam or sponge rubber and it is pre-stressed against the solder sleeve 28. As will hereinafter be seen, when said solder sleeve is melted, the rubber sleeve will expand radially inwardly.

Occupying well 22 is a chemical composition 32 such as potassium chlorate and sugar in the ratio of 2 parts to 1 or another strong oxidizing agent combined with sugar or like carbohydrate. This would normally be in solid, powder or crystalline form. Within said chemical composition 32 is a rupturable capsule 34 made, for example, of relatively fragile glass. Enclosed within said capsule is a strong oxidizing acid 36 such as concentrated sulfuric acid of 96% concentration. Holding the chemical composition 32 in place within well 22 and within the lower end of solder sleeve 28 is a paraffin seal 38. Lining the inner wall of the solder sleeve 28 above the paraffin seal is a layer of soldering flux 40.

Figure 3:
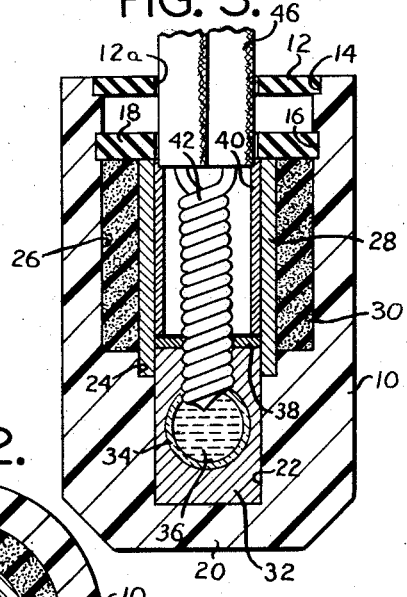
Fig. 3 is a view similar to that of Fig. 1 but showing a pair of inter-twisted or spliced wires inserted therein and penetrating the capsule of acid.
Figure 2:
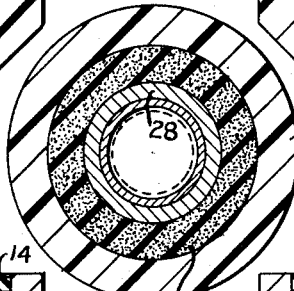
Fig. 2 is a transverse section on the line 2—2 of Fig. 1.
Figure 4:
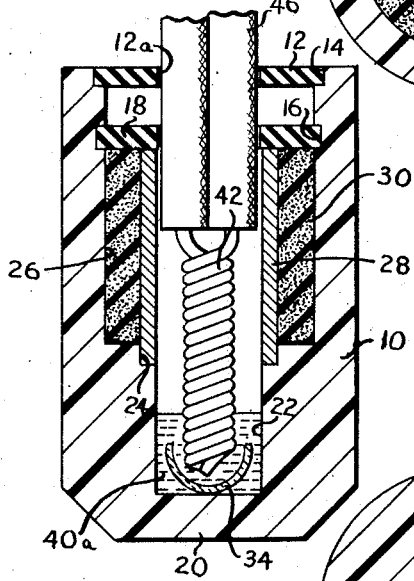
Fig. 4 is a view similar to that of Fig. 3 but showing the result of the reaction between the acid and the material surrounding the acid, wherein the soldering flux is melted but before the solder sleeve is melted.
Figure 5:
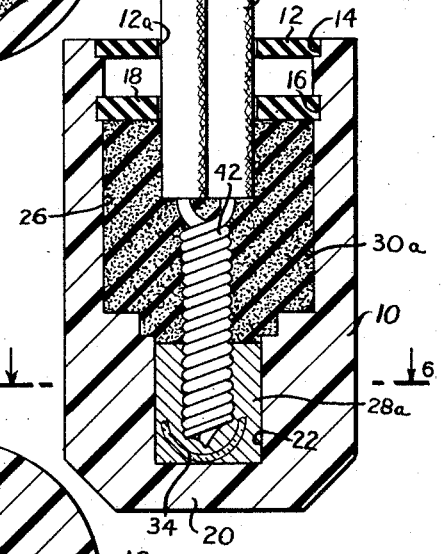
Fig. 5 is still another view similar to that of Fig. 4 but showing the solder sleeve melted down and soldering the twisted wires together and showing the compressed rubber in expanded condition forming a seal between the cap and the spliced wires.
Figure 6:
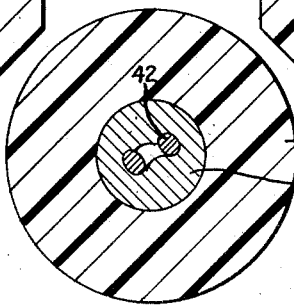
Fig. 6 is a transverse section on the line 6—6 of Fig. 5.

To use the soldering cap above described, all that need be done is to insert a pair of twisted wires 42 through opening 12a in plate 12, opening 18a in retaining washer 18, and solder sleeve 28 and into penetrating engagement with capsule 34. This is shown in Fig. 3. Once the capsule is ruptured, as shown in Fig. 4, the acid will react with the potassium chlorate to liberate sufficient oxygen to oxidize the sugar and generate heat. The potassium chlorate and sugar will change their respective forms as will the acid and they will disappear in the form of combustion and other gases. Only an insignificant amount of ash, possibly potassium chloride, will remain. Consequently, in the showing of Fig. 4, all that remains in well 22 is the ruptured capsule 34 and the melted flux 40a which ran down from the inner wall of solder sleeve 28 by reason of the heat which the above reaction generated. The heat also melts the solder sleeve 28 and the result of this action is illustrated in Fig. 5 wherein the melted solder 28a is shown collected within the well 22 and upon the twisted wires 42. These twisted wires are now soldered together and held within the casing 10.

As soon as the solder sleeve 28 melts, the pre-stressed rubber sleeve 30 will expand into engagement with the wires and it will be observed that the entire chamber 26 is now filled with said rubber and the wire which it engages. There is a conventional insulating covering 46 on the wires and said covering projects into chamber 26. Consequently, the rubber 30a engages not only the bare wires themselves but also the inwardly projecting portion of the insulating covering 46. It is evident that the soldered splice is now fully insulated.

As combustion of the outer wall 32 progresses downwardly, commencing with combustion of the bight 34, the rubber 42 commences to react in the presence of the heat liberated as a result of such combustion and a foaming action begins to take place. This not only cures the rubber but also expands it and substantial pressure is thereby developed by the expanding rubber. This pressure is contained by the casing 10 and to a large extent by the top cover 12 and consequently the pressure is directed inwardly and upon the twisted wires and the melted solder. This causes the melted solder to collect upon the lower end of the twisted wires in the form of a glob or mass 50. The rest of the space within the casing 10 is completely filled with foam rubber 52 as Fig. 5 clearly shows. Combustion has reduced the ignitable substance 24, the capsule 26, the glycerine 28, the flux 36, the paraffin 38, and the potassium perchlorate and aluminum powder 30, 32 and 34 to gases or insignificant quantities of ash and the gases have now escaped from the casing through openings 12c and possibly through the openings 12b and all that remain within the casing are the twisted wires, the solder and the foam rubber. The twisted wires are now adequately soldered together and properly insulated both mechanically and electrically.

The foregoing is illustrative of a preferred form of this invention and it will be understood that this preferred form may be modified and other forms may be provided within the broad spirit of the invention and the broad scope of the claims.

I claim:

1. A soldering device of the character described, comprising a dielectric cylindrical casing which is open at the top and closed at the bottom, a solder sleeve centrally disposed and secured within said casing and substantially concentric therewith, heat generating means contained within said casing adjacent said solder sleeve, said heat generating means being secured below and centrally located with respect to the solder sleeve, said heat generating means comprising a rupturable capsule containg a strong acid and a chemical composition consisting of potassium chlorate and sugar surrounding said capsule, a soldering flux carried within the solder sleeve, and attached to its inner wall, and retaining means for retaining said chemical composition and solder sleeve in place within said casing, said capsule being rupturable upon insertion of a twisted wire into engagement therewith through the solder sleeve, whereby the acid contained therein is permitted to react with the chemical composition to generate sufficient heat to melt the solder flux and solder sleeve in order to coat the twisted wire with solder.

2. A soldering device in accordance with claim 1, wherein an annular space is provided between the solder sleeve and the inner wall of the casing, a pre-stressed rubber ring being provided in said annular recess which presses radially inwardly against said solder sleeve and radially outwardly against said inner wall of the casing, whereby said rubber ring is enabled to expand radially inwardly and against an inserted twisted wire when the solder sleeve is melted by the heat generated upon reaction of the acid with the chemical composition.

3. A soldering device in accordance with claim 1, wherein the soldering flux comprises a layer which lines the inner wall of the solder sleeve.

4. A soldering device in accordance with claim 1, wherein the heat generating means is provided in a well in the bottom of the casing, immediately below the solder sleeve and aligned therewith, an annular rabbet being provided along the upper peripheral edge of said well and the lower end of said solder sleeve being disposed within said rabbet, said solder sleeve being thereby adapted to extend the effective length of said well in upward direction, said heat generating means being disposed with its rupturable capsule and the major part of its chemical composition within said well, a portion of said chemical composition extending upwardly into the lower end of said solder sleeve.

5. A soldering device of the character described, comprising a dielectric casing, a solder sleeve disposed within said casing, heat generating means contained within said casing adjacent said solder sleeve, said heat generating means comprising a rupturable capsule containing a strong acid and a chemical composition consisting of potassium chlorate and sugar surrounding said capsule, a soldering flux carried within the solder sleeve and retaining means for retaining said chemical composition and solder sleeve in place within said casing, said capsule being rupturable upon insertion of a twisted wire into engagement therewith through the solder sleeve, whereby the acid contained therein is permitted to react with the chemical composition to generate sufficient heat to melt the solder flux and solder sleeve in order to coat the twisted wire with solder, said casing being closed at its lower end and open at its upper end and being provided with a stepped inner chamber comprising a relatively small well at its lower end, an annular rabbet formed along the upper peripheral edge of said well, and a relatively large cylindrical chamber above said rabbet, the solder sleeve being disposed within said cylindrical chamber with its lower end projecting downwardly into said rabbet, the heat generating means being disposed within said well, the chemical composition thereof being in contact with the lower end of said solder sleeve, a paraffin seal covering said chemical composition, a layer of solder flux lining the inner wall of said solder sleeve, an annular space provided between the outer wall of said solder sleeve and the inner wall of said casing, a pre-stressed rubber ring mounted in said annular space and pressing radially outwardly against the inner casing wall and radially inwardly against the outer wall of the solder sleeve, and a retaining ring secured to the upper end of said casing within said cylindrical chamber and abutting the upper ends of the solder sleeve and rubber ring to hold them in place in the casing.

References Cited in the file of this patent

UNITED STATES PATENTS 1,923,073　　Brell ------------------ Aug. 22, 1933